United States Patent [19]
Backlund

[11] Patent Number: 6,065,666
[45] Date of Patent: May 23, 2000

[54] DEVICE FOR SOLDERING A SERIES OF CONNECTORS AND A METHOD OF USE

[75] Inventor: David D. Backlund, Hanover, Minn.

[73] Assignee: Seagate Technology, Inc., Scotts Valley, Calif.

[21] Appl. No.: 09/054,655

[22] Filed: Apr. 3, 1998

Related U.S. Application Data

[60] Provisional application No. 60/062,504, Oct. 16, 1997.

[51] Int. Cl.[7] .............................. B23K 1/00; B23K 3/03
[52] U.S. Cl. .................. 228/180.21; 228/55; 219/85.16
[58] Field of Search .................. 228/51, 55, 180.21; 219/85.16

[56] References Cited

U.S. PATENT DOCUMENTS

| | | | |
|---|---|---|---|
| 4,894,506 | 1/1990 | Woerner | 219/85.16 |
| 5,068,508 | 11/1991 | Phalon, Jr. et al. | 219/85.16 |
| 5,229,575 | 7/1993 | Waller et al. | 219/233 |
| 5,614,118 | 3/1997 | Weber | 219/85.16 |

OTHER PUBLICATIONS

N. F. Jensen, "Self–Leveling Soldering Tool," IBM Tech. Discl. Bull., vol. 11, No. 8, p. 1026, Jan. 1969.

*Primary Examiner*—Samuel M. Heinrich
*Assistant Examiner*—Jeffrey T. Knapp
*Attorney, Agent, or Firm*—Westman, Champlin & Kelly

[57] ABSTRACT

A soldering member includes an elongated heating element for soldering a series of connectors. The elongated heating element of the soldering member is flexibly supported via a rigid base for adjusting the orientation of the heating element to align with a series of connectors rigidly supported for soldering. A method of using the soldering member is also described.

15 Claims, 9 Drawing Sheets

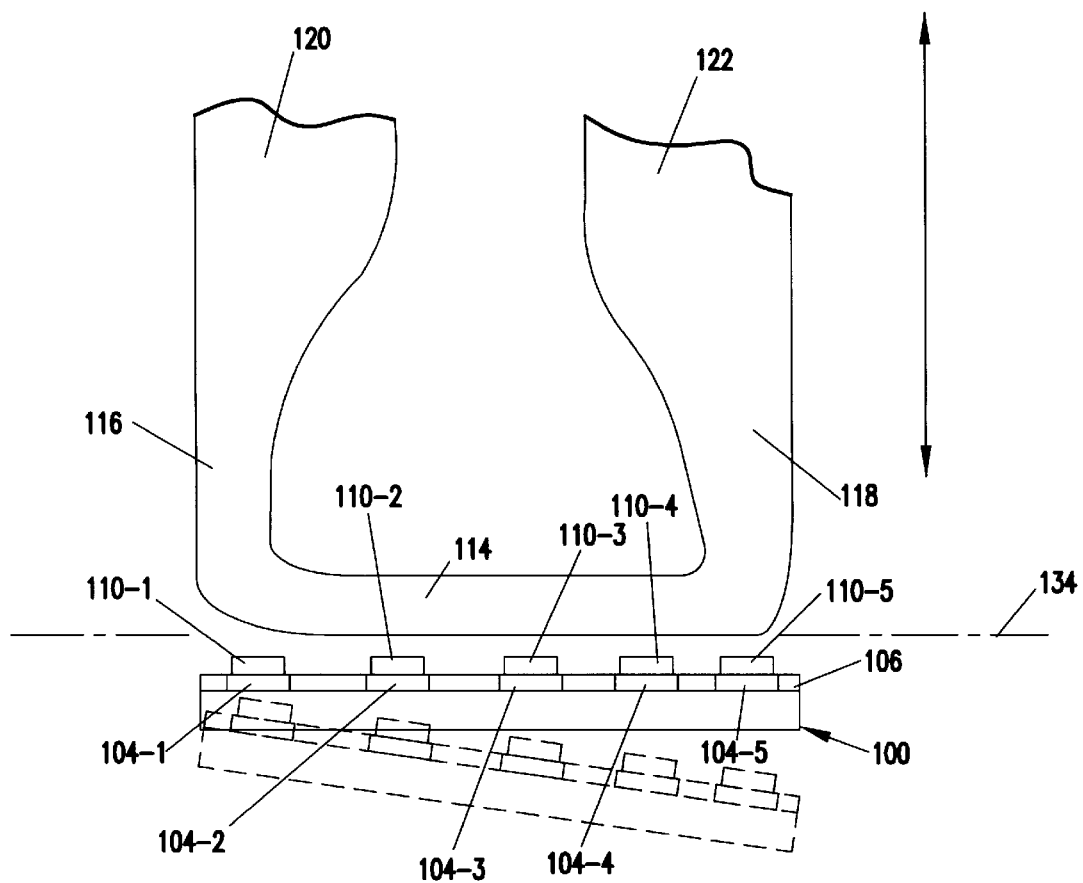

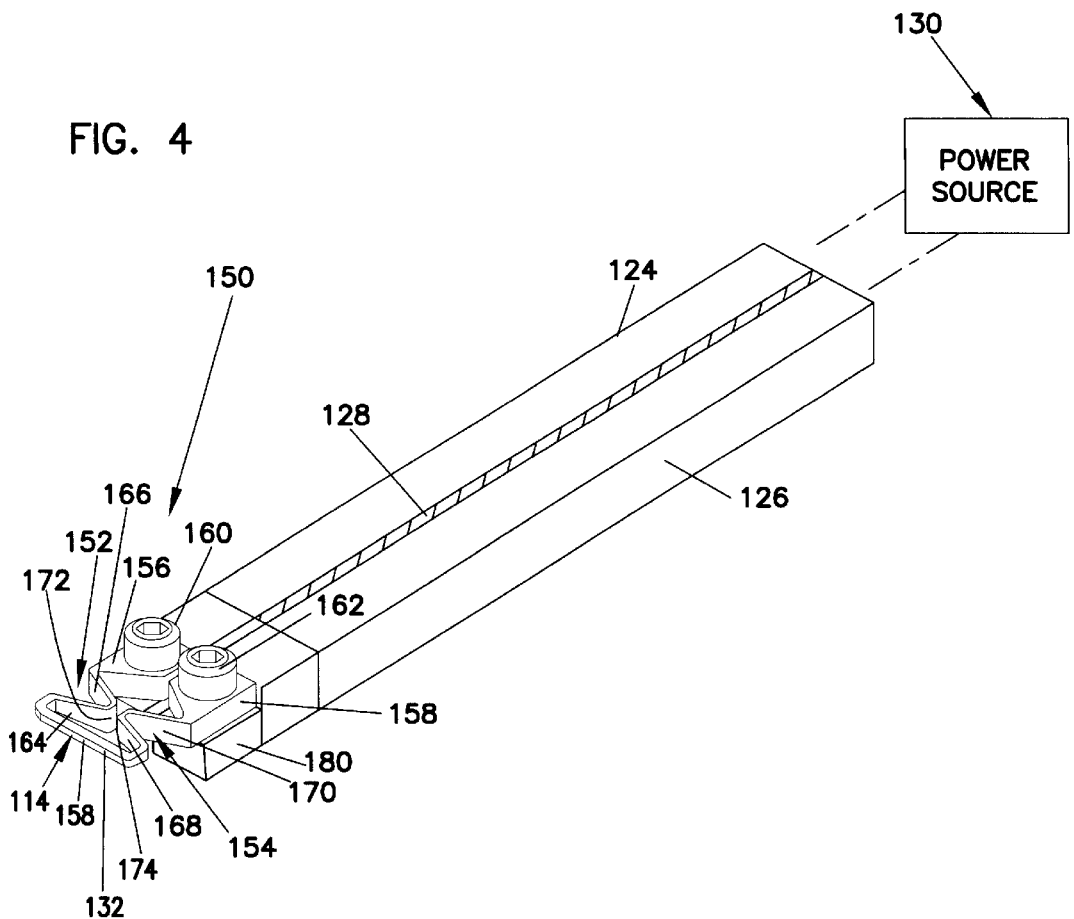
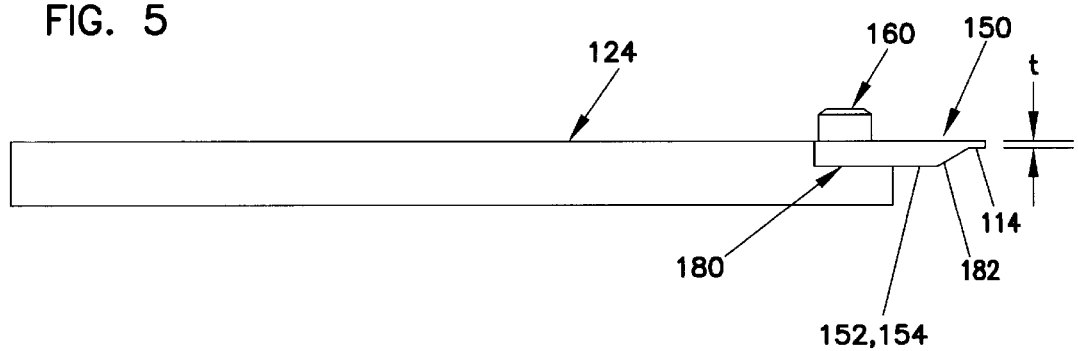

DEVICE FOR SOLDERING A SERIES OF CONNECTORS AND A METHOD OF USE

CROSS-REFERENCE TO RELATED APPLICATION

This application claims priority to Provisional Application Ser. No. 60/062,504, filed Oct. 16, 1997, and entitled "HOT BAR SOLDERING WITH PLANARITY COMPENSATION".

FIELD OF THE INVENTION

The present invention relates to a soldering device for providing an electrical connection between connectors. In particular, the present invention relates to a soldering device for connecting a series of connectors with a single heating element.

BACKGROUND OF THE INVENTION

Disc drive systems are well known which operate and transmit data via electronic circuitry. To assemble a disc drive, electrical connections are made by soldering connectors to couple the circuitry of the disc drive for operation. In particular, a series of leads coupled to transducer elements of a head are soldered to conductive pads to connect to circuitry of the disc drive. A series of leads arranged along a common axis are soldered to a series of conductive pads arranged along a common axis using an elongated planar soldering element so that all of the electrical connections can be made in a single soldering operation.

During the soldering operation, the soldering element must be precisely aligned to contact the entire series of connectors. If one or more of the connectors is not properly soldered, the transducer elements of the heads will not be properly connected to circuitry of the disc drive for read and write operations. Accordingly, it is important to ensure that the soldering member provides sufficient heat and pressure to each connector of a series of connectors to electrically connect transducers to circuitry of the disc drive for operation. The present invention addresses these and other problems and offers other advantages over the prior art.

SUMMARY OF THE INVENTION

The present invention relates to a soldering member having an elongated heating element for soldering a series of connectors. The elongated heating element of the soldering member is flexibly supported via a rigid base for adjusting the orientation of the heating element to align with a series of connectors rigidly supported for soldering. The flexibly supported heating element allows the orientation of the heating element to be adjusted so that the heating element contacts each connector to electrically connect the series of connectors for operation of the disc drive.

BRIEF DESCRIPTION OF THE DRAWINGS

FIG. 3 is an illustration of operation of a prior art soldering member used to solder a series of connectors.

FIG. 4 is a perspective view of an embodiment of a soldering member of the present invention.

FIG. 5 is a side elevational view of the soldering member of FIG. 4.

DETAILED DESCRIPTION OF THE PREFERRED EMBODIMENTS

Figure 1:
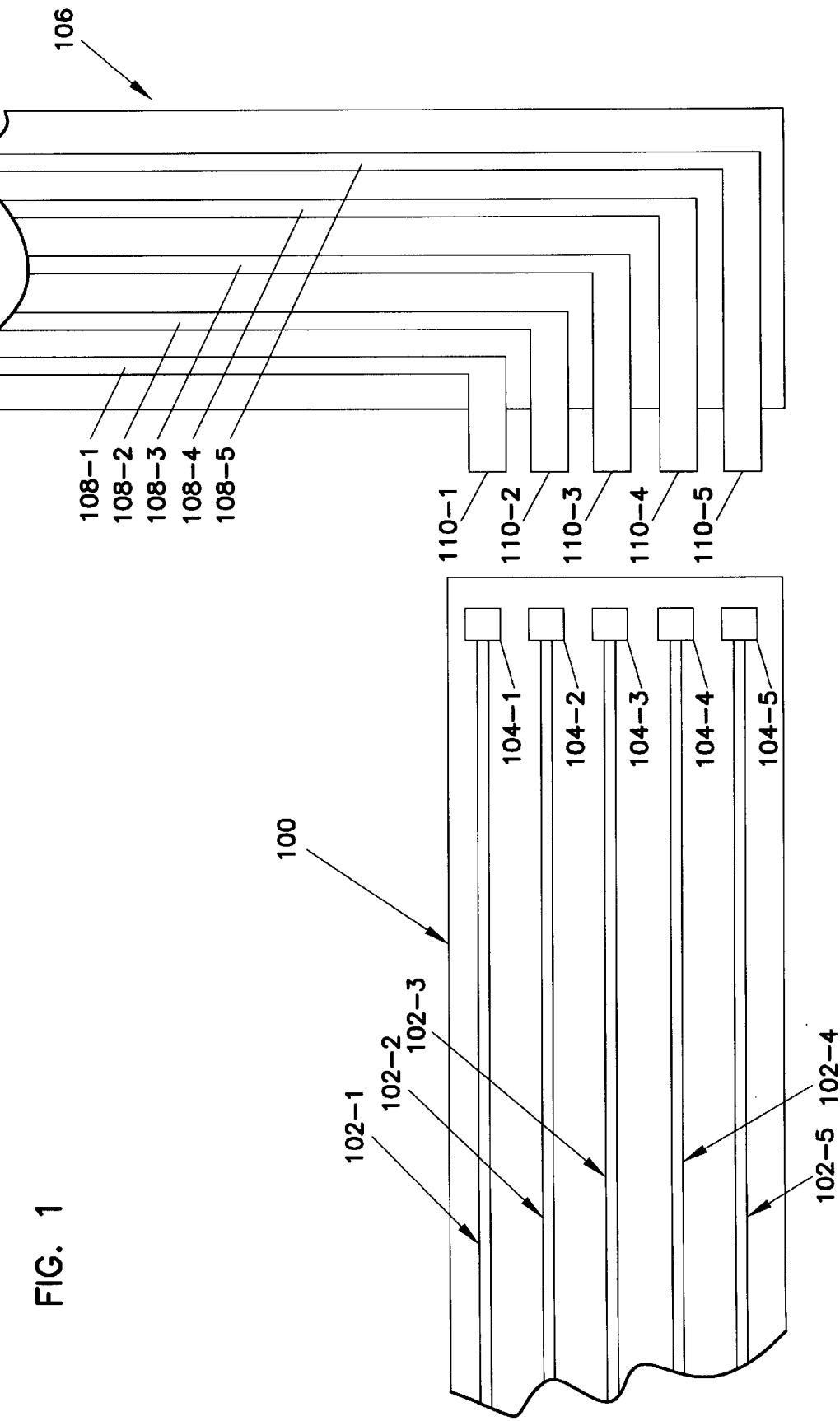
FIG. 1 is an illustration of first and second circuit portions having a series of connectors which are soldered to electrically connect the first and second circuit portions.

The present invention relates to a device for soldering a series of connectors to provide an electrical connection between separate circuit portions. FIG. 1 illustrates a first printed circuit portion 100 including a plurality of conductor paths 102-1–102-5 having a plurality of conductor pads 104-1–104-5 coupled thereto, and a second printed circuit portion 106 including a plurality of conductor paths 108-1–108-5 coupled to a plurality of leads 110-1–110-5. As shown, conductors pads 104 of circuit portion 100 are arranged in a series such that conductors pads are spaced along a common axis and coupled to spaced conductive paths 102-1–102-5 along a printed circuit portion. Leads 110-1–110-5 are similarly arranged in a series and are spaced along a common axis and couple to conductor paths 108-1–108-5 of the second printed circuit portion 106. The leads 110-1–110-5 are soldered to conductor pads 104-1–104-5 to provide a series of electrical contacts to provide an electrical connection between the paths of the first and second circuit portions.

Figure 2:
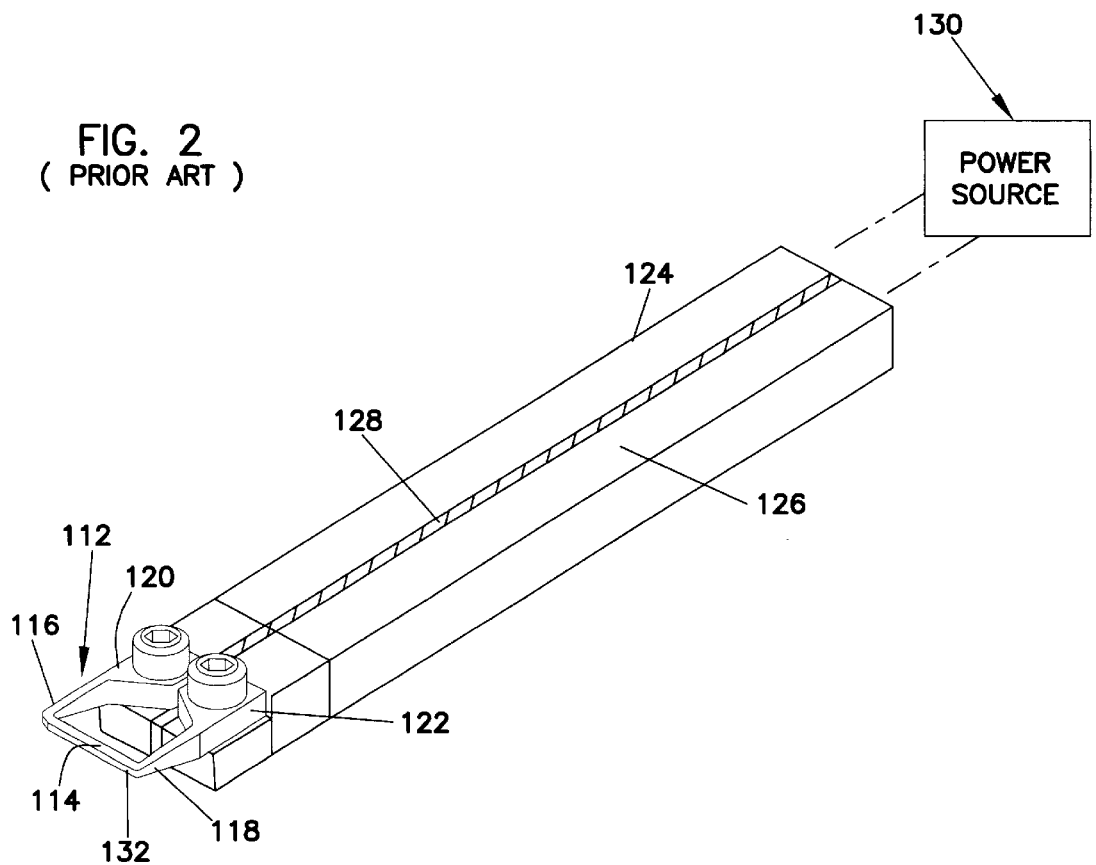
FIG. 2 is a perspective view of a soldering member of the prior art.

The connectors (i.e. leads 110-1 to 110-5 and pads 104-1 to 104-5) are soldered by a soldering device including a soldering member. FIG. 2 illustrates a soldering member 112 having a heating element 114 designed to solder a series of connectors to provide an electrical connection between multiple circuit portions. The embodiment of the soldering member 112 shown in FIG. 2 includes heating element 114; spaced arms 116, 118; and stems 120, 122. Spaced arms 116, 118 are coupled to opposed ends of the heating element 114, and stems 120, 122 are coupled to spaced arms 116, 118. As shown, spaced arms 116, 118; stems 120, 122; and heating element 114 define a heating member, as will be explained.

Rigid conductors 124, 126 are supported in parallel spaced relation via an insulating layer 128 which extends between conductors 124, 126 to electrically insulate conductors 124, 126. Heating element 114 is coupled to conductors 124, 126 which are coupled to a power source 130 (shown schematically) to heat the heating element 114 for soldering operation. In the embodiment shown, conductors 124, 126 are coupled to power source 130 and to arms 116, 118 to provide current through conductors and the heating member formed of arms 116, 118 and heating element 114. Conductors 124, 126 are adapted to couple to a support fixture (not shown) and are supported thereby.

In particular, the heating member is formed of a "U"-shaped member including spaced arms 116, 118 supporting a cross member, which defines heating element 114. Opposed arms 116, 118 are coupled to conductors 124, 126 via stems 120, 122, formed at ends of arm 116, 118. Stems 120, 122 provide a wide connection for securing the heating member to conductors 124, 126. Current flows through conductors 124, 126; arms 116, 118; and the cross member. Current flowing through the cross member heats the cross member to define the transverse elongated heating element 114. The cross member includes an exposed flat surface 132 which defines a planar heating surface for soldering a series of connectors. Conductors 124, 126 are formed of a relatively conductive material, such as copper. The heating member is formed of a steel material having sufficient resistivity to heat the heating element 114 for use.

As shown in FIG. 3, heating element 114 is aligned with a series of connectors for soldering operation. As shown, the length of the cross member is designed so that heating element 114 contacts each connector in the series to simultaneously solder each connector in one application. The soldering member 112 and the series of connectors may be supported in relative alignment between a retracted position (not shown in FIG. 3) and a contact position for soldering. To solder the connectors, the soldering member 112 is moved to the contact position so that the heating element 114 contacts the connectors (i.e. conductive pad and leads) for soldering. FIG. 3 illustrates heating element 114 aligned with conductive pads 104-1–104-5 and leads 110-1–110-5 in the contact position. As shown in FIG. 3, in the contact position, heating element 114, leads 110, and pads 104 are aligned along a common soldering axis 134 so that heating element 114 heats and solders leads 110-1–110-5 to pads 104-1–104-5

If the connectors and heating element are misaligned or not aligned along a common soldering axis 134 (i.e. the support axis of connectors is different than the soldering axis for heating element 114), then the heating element 114 will not contact and solder each of the connectors of the series of connectors. For example, as shown in FIG. 3, although heating element 114 is aligned along the soldering axis 134, circuit portions and connectors shown in phantom are out of alignment with the soldering axis 134; and, thus, heating element 114 will not contact each connector of the series of connectors, thus degrading the electrical connection and operation of the circuit portions 100 and 106.

FIGS. 4–5 illustrate an improved soldering member 150 of the present invention, which compensates for misalignment between the cross member or heating element 114, and a series of connectors. Soldering member 150 includes heating element 114 (similar to soldering member 112 illustrated in FIGS. 2–3), and like numbers are used to refer to like parts. As shown, soldering member 150 is supported relative to conductors 124, 126 supported in spaced relation, as illustrated in FIGS. 2–3. Heating element 114 is formed of an elongated cross member extending between and supported by arms 152, 154. In the embodiment of the invention shown, arms 152, 154 are coupled to conductors 124, 126 to form a continuous heating member or circuit for heating element 114 for operation. The cross member includes an exposed planar surface 132 to define a planar heating surface for soldering operation. Arms 152, 154 are coupled to conductors 124, 126 via stems 156, 158. The heating member is constructed of a steel material having sufficient resistivity to heat heating element 114 for use.

Arms 152, 154 are designed to flexibly support the cross member or heating element 114 in contrast to the rigid support arms 116, 118 of soldering member 112 shown in FIGS. 3–4. Arms 152, 154 support cross member or heating element 114 so that the orientation (i.e. soldering axis 134) of the cross member or heating element may be adjusted to align with a series of connectors rigidly supported for a soldering operation. Stems 156, 158 are formed of sufficient planar dimension to support fastener members 160, 162 to couple stems 156, 158, and (heating member) to conductors 124, 126. Conductors are formed of rigid members and cooperatively form a rigid support for the heating element 114 in combination with stems 156, 158.

Arms 152, 154 flexibly support the cross member or heating element relative to the rigid support. Arms 152, 154 include spring members integrally formed therewith, as will be explained. The integrally formed spring members provide a flexible connection for heating element 114 relative to the rigid support for adjusting the orientation of the soldering axis 134 depending upon the orientation of a series of rigidly supported connectors.

As shown in the embodiment of the invention illustrated in FIG. 4, arms 152, 154 include spring arm portions 164, 166 and 168, 170 flexibly coupled via elbows 172, 174, respectively. Spring arm portions 164, 166 and 168, 170 flex relative to one another to provide a spring relation between portions 164, 166 and 168, 170. Ends of arm portions 166 and 170 are coupled to stems 156 and 158 for connection to a rigid support structure. Ends of arm portions 164, 168 couple to the heating member 114 as shown. Thus, arms 152, 154 flexibly support heating element 114 relative to the rigid support structure via flexure of arm portions 164, 166 and 168, 170 at elbows 172, 174. Flexure of arm portions 164, 166 and 168, 170, relative to elbows 172, 174, adjusts the orientation of the soldering axis 134 (i.e., heating element 114) for alignment with the support axis of the series of connectors.

Preferably, arm portions 166 and 170 are coupled to opposed ends of the cross member, forming the heating element 114. As shown, conductors 124, 126 include stepped ends 180. Stems 156, 158 of the heating member are supported by and connected to conductors 124, 126 at stepped ends 180 via fasteners 160, 162. As shown in FIG. 5, the thickness t of the cross member (or planar heating surface 132) is sized relative to the dimension of a connector (i.e. conductive pad) so that heating element 114 heats only the area required to electrically connect the lead to the conductive pad. The thickness of arms 152, 154 is designed to provide the desired rigidity and flexibility to adjustably and flexibly support the heating element for operation. A transition portion 182 of the heating member provides a gradual transition between thicker-dimensioned arms 152, 154 and smaller-dimensioned cross member or heating element.

Figure 6:
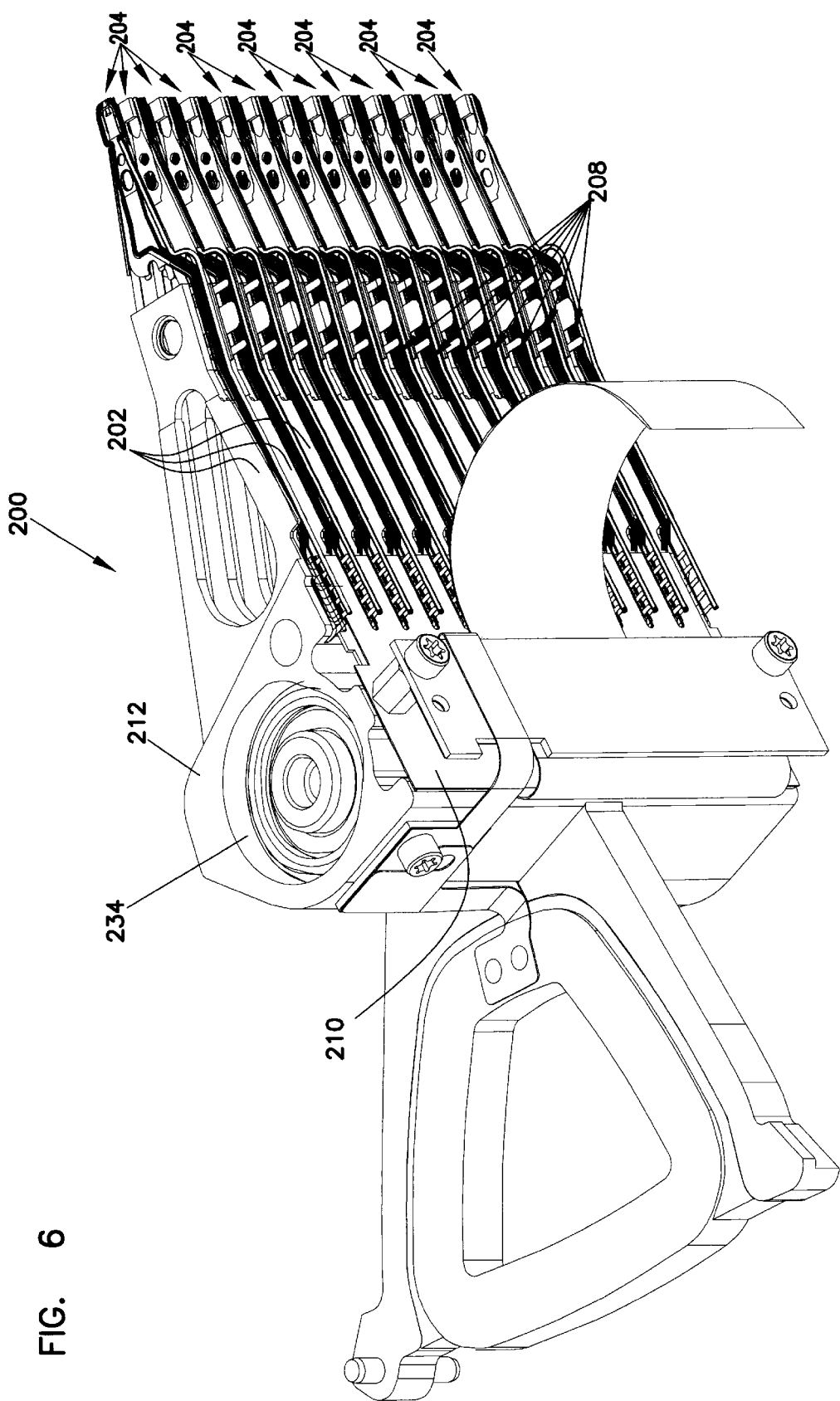
FIG. 6 is a perspective view of an actuator block having a plurality of actuator arms supporting heads coupled to circuitry of a disc drive (not shown).

The present invention has particular application for electrically connecting circuitry of a disc drive. In particular, the present invention has application for connecting transducer elements of a disc head to circuitry of the disc drive. FIG. 6 illustrates an actuator block ("E"-block) 200 which includes a plurality of spaced stacked actuator arms 202 supporting a plurality of head 204 to read and write data to a disc (not shown). Transducers of each head are electrically coupled to circuitry of the disc drive for operation. In particular, in one embodiment of an actuator block 200, transducers of each head 204 are coupled to printed flex circuits 208, supported via actuator arms 202. The flex circuits 208 supported by each actuator arm 202 are coupled to a common flex circuit 210 operably coupled to main portion 212 of the actuator block 200.

Figure 7:
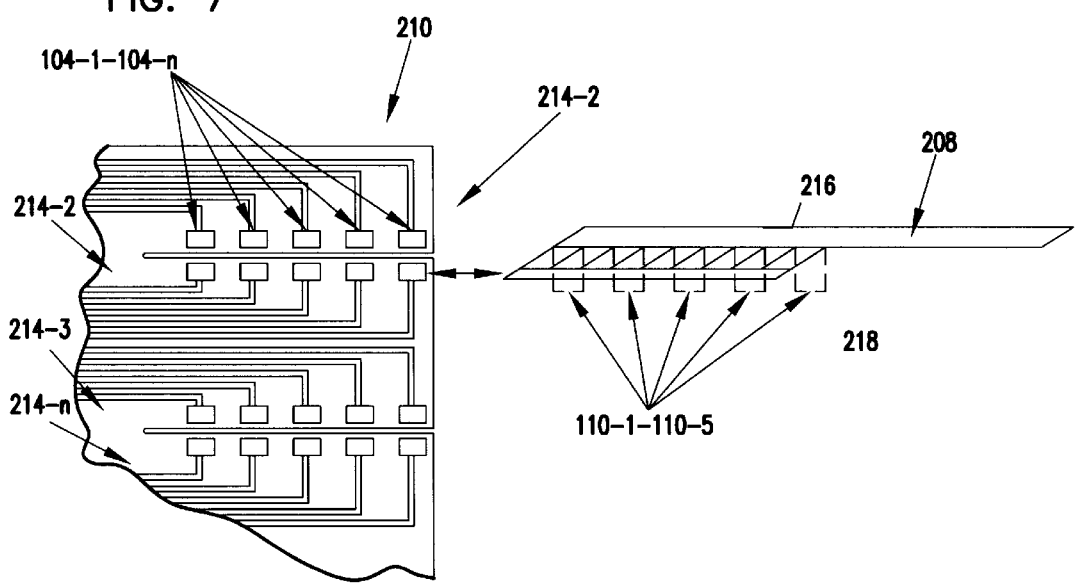
FIG. 7 is a detailed illustration of flex circuits (only one shown) coupled to individual heads and a common flex circuit coupled to an actuator block.

FIG. 7 is a more detailed view of flex circuit 210, supported at main portion 212, and flex circuits 208, supported by individual actuator arms 202. As illustrated in FIG. 7, the common flex circuit 210 includes a plurality of rows 214-1 to 214-n of conductive pads 104 (where n is the number of connector series based upon the number of actuator arms 202 supporting heads 204 relative to discs (not shown)). Each row 214-1 to 214-n includes a series of spaced conductive pads 104 and conductive paths 102. The number of conductive pads 104 depends upon the number of electrical connections required to operate the transducers of heads 204 supported by actuator arms 202 to read and write data.

As shown, flex circuits 208 (only one shown) include a plurality of conductive paths (not shown in FIGS. 6 & 7) and a plurality of leads 110 coupled to the conductive paths and extending from a base 216 of the flex circuit 208. Each head 204 includes a flex circuit 208 which is supported by the actuator arm 202 (and suspension assembly) supporting the head 204. The flex circuit 208 is electrically coupled to the transducer elements of the head 204 for operation of the disc drive. Preferably, prior to assembly, a tab 218 is coupled to extended ends of the leads 110-1–110-5 to limit electrostatic discharge. Tab 218 is removed to connect leads 110 to conductive pads 104 on common flex circuit 210. Leads fold over, as illustrated in phantom in FIG. 7, to align with conductive pads 104 supported by main portion 212. Leads 110 are soldered to conductive pads 104 to provide an electrical connection for transferring the signals to and from individual heads of the disc drive for read and write operations.

Figure 8:
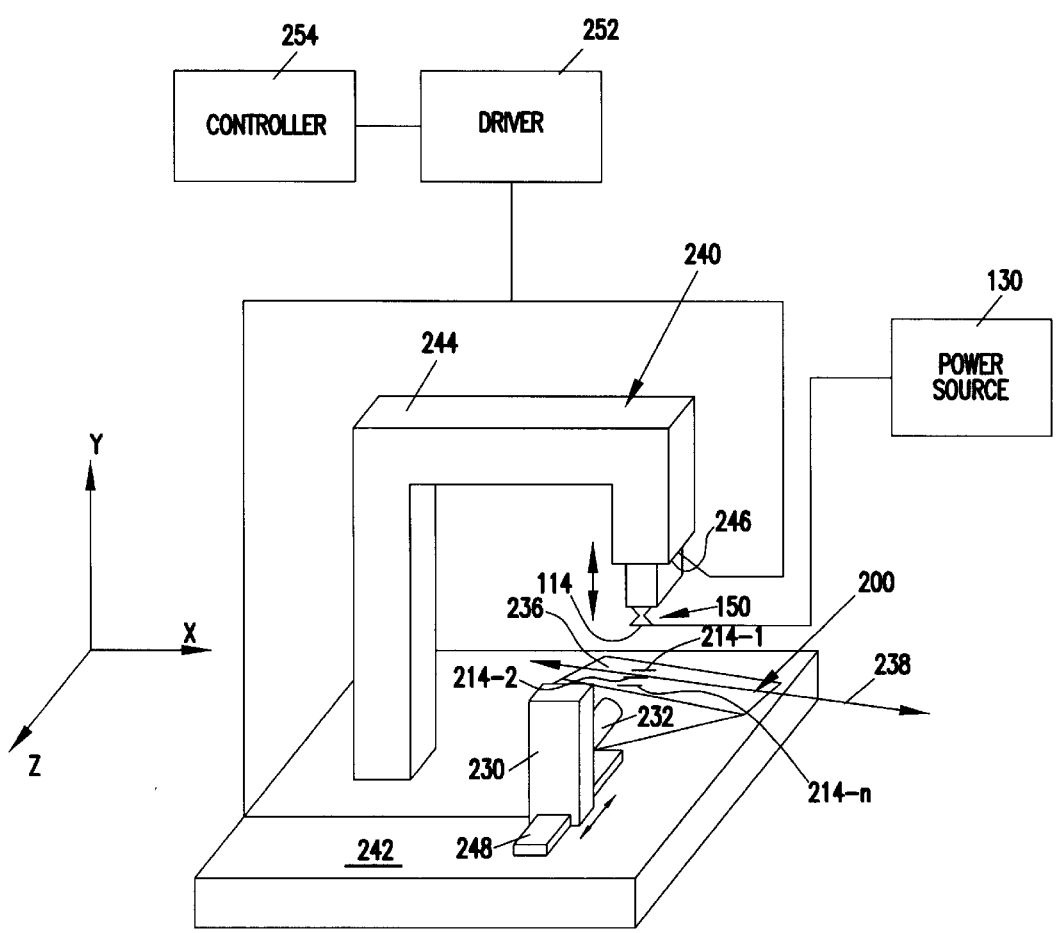
FIG. 8 is a schematic illustration of an operating fixture supporting a soldering member for soldering a series of connectors for electrically connecting transducer elements of a head to circuitry of a disc drive.

The soldering member of the present invention is used to solder each row 214-1–214-n of connectors 104-1–104-n. FIG. 8 schematically illustrates use of the soldering member for soldering connectors for each row 214-1–214-n to electrically connect disc heads to circuitry of the disc drive. As shown schematically, actuator block 200 is supported by a block mount 230, which includes a transverse rod 232 which extends through a bearing channel 234 (illustrated in FIG. 6) of actuator block 200 to support actuator block 200 for soldering operation. The actuator block 200 is supported so that a face 236 of the main portion 212 supporting the flex circuit 210 is aligned facing the soldering member 150 as will be explained. The orientation of face 236 defines the support axis 238 for connectors on the actuator block 200.

Soldering member 150 is movably supported by support fixture 240 along the "y" axis to operate between a raised position (shown) and a lowered soldering contact position (not shown) to align heating element 114 with face 236 for soldering operation. The position of actuator block 200 is adjusted along the z axis for aligning heating element 114 with each sequential row 214-1–214-n of connectors. The soldering member support fixture 240 is supported via base 242 and includes a fixture arm 244 and movable fixture arm extension 246 for raising and lowering soldering member 150 coupled to movable fixture arm extension 246. Block mount 230 is movably supported along track 248 coupled to base 242 for adjusting the position of actuator block 200 for sequentially aligning rows 214-1–214-n of connectors with soldering member 150 (i.e., heating element 114). Soldering member 150 is rigidly coupled to fixture arm extension 246 to support heating element 114 between a raised position and a lower soldering contact position. The orientation of heating element 114 coupled to fixture arm extension 246 defines the orientation of the soldering axis 134.

For operation, the actuator block 200 is mounted to block mount 230 in alignment with the soldering member 150 supported by the movable fixture arm extension 246. The "z" axis position of the block mount 230 is adjusted via movement of block mount 230 along track 248 to align rows 214-1–214-n of connectors with heating element 114 for soldering each row of connectors. Soldering member 150 is operated along the "y" axis between the raised position (shown) and a lower soldering contact position (not shown) to contact and solder a series of connectors. Operation of block mount 230 along track 248 is effected via driver 252 coupled to controller 254. Driver 252 may be a motor or hydraulic or pneumatic device (not shown). Block mount 230 and fixture arm extension 246 may be automatically controlled and operated or may be manually operated. Current is supplied via power source 130 to heat heating element 114 as previously explained to solder a row of contacts.

As previously explained, heating element 114 must contact each connector to properly connect the head 204 to circuitry of the disc drive. Thus, orientation of the heating element (or soldering axis 134) must coincide with the support axis 238 of the actuator block 200. In prior art designs, cross member or heating element 114 was rigidly supported by arms 116 and 118; and, thus, the axis of cross member or heating element 114 was fixed and could not be adjusted relative to the support axis of a series of connectors to be soldered. Since it was difficult to consistently align heating element 114 with a series of connectors, it was difficult to assure proper assembly of an operable disc drive with the soldering member of the prior art.

Figure 9:
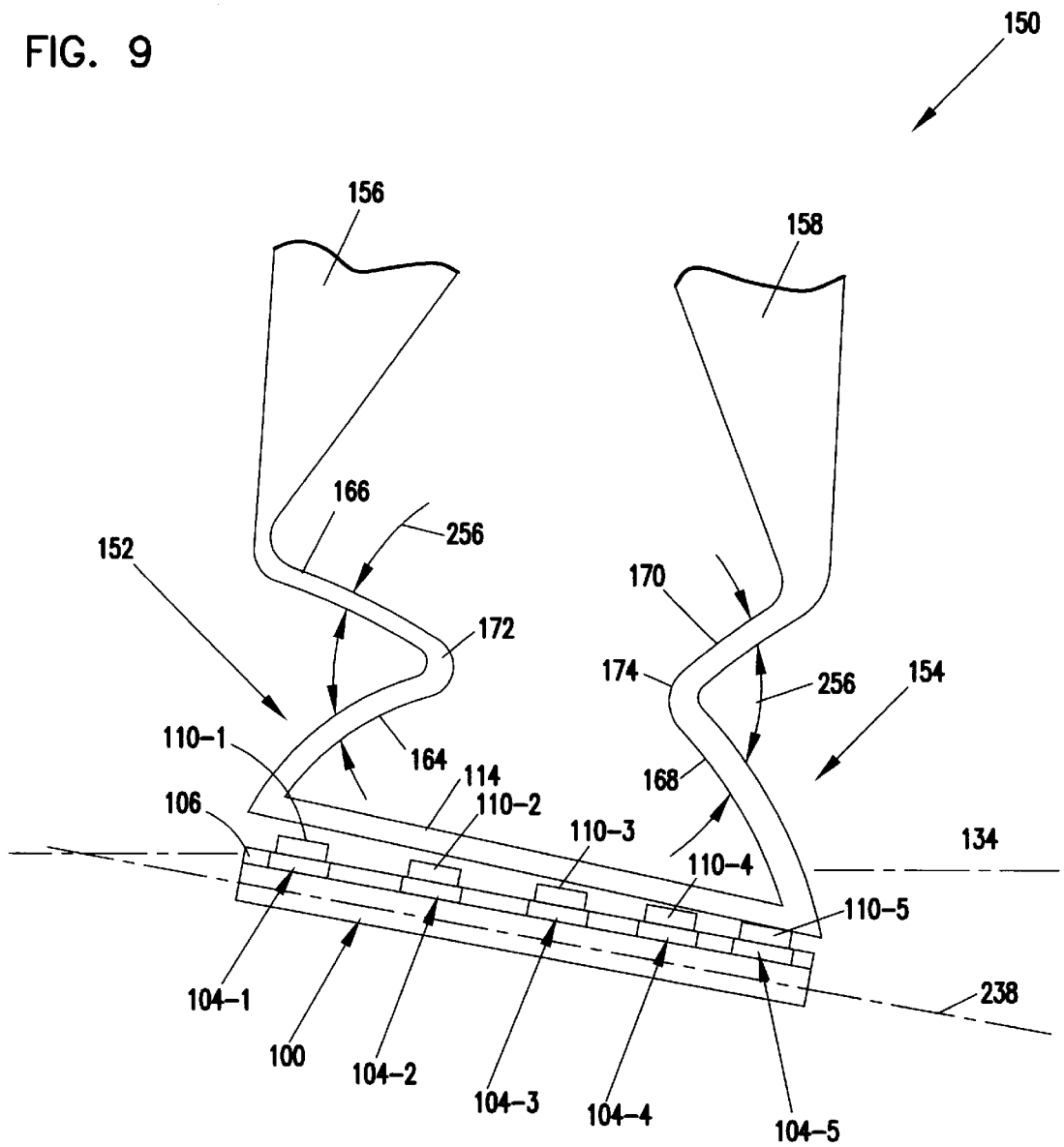
FIG. 9 is an illustration of operation of a soldering member of the present invention used to solder a series of connectors.

In the soldering member of the present invention, flexible arms 152, 154 compensate for variations between the support axis 238 of the connectors and the support axis 134 of the heating element 114, as illustrated in FIG. 9. In particular, arm portions 164, 166 and 168, 170 of arms 152, 154 flex as illustrated by arrows 256 relative to elbows 172, 174 to align the cross member or heating element 114 relative to support axis 238 of connectors. For operation, the soldering member is lowered to a soldering position so that heating element 114 contacts a row of connectors supported on actuator block 200. Since the heating element 114 is flexibly supported, rather than rigidly supported, the soldering member may be continually lowered via flexure of arms 152, 154, as illustrated by arrows 256 so that the entire length of heating element 114 is flush with a series of connectors, so that the entire length of the planar heating surface 132 contacts the actuator block 200 to solder the connector series.

More particularly, as illustrated in FIG. 9, the soldering member is lowered toward circuit portions until the heating element 114 contacts circuit portions supported via an actuator block. The soldering member is continually lowered via flexure of arms 152, 154 until the heating element 114 contacts each of the connectors of the series for soldering. In particular, arm 152 is compressed at elbow 172 so that the heating element can be lowered until the heating element is aligned with axis 238. In the embodiment shown, the length of the cross member between opposed ends is sized to correspond to the length of a series of connectors. Preferably, arms 152, 154 are coupled to the cross member at opposed ends to define the heating circuit or heating member of the soldering member.

Figure 10:
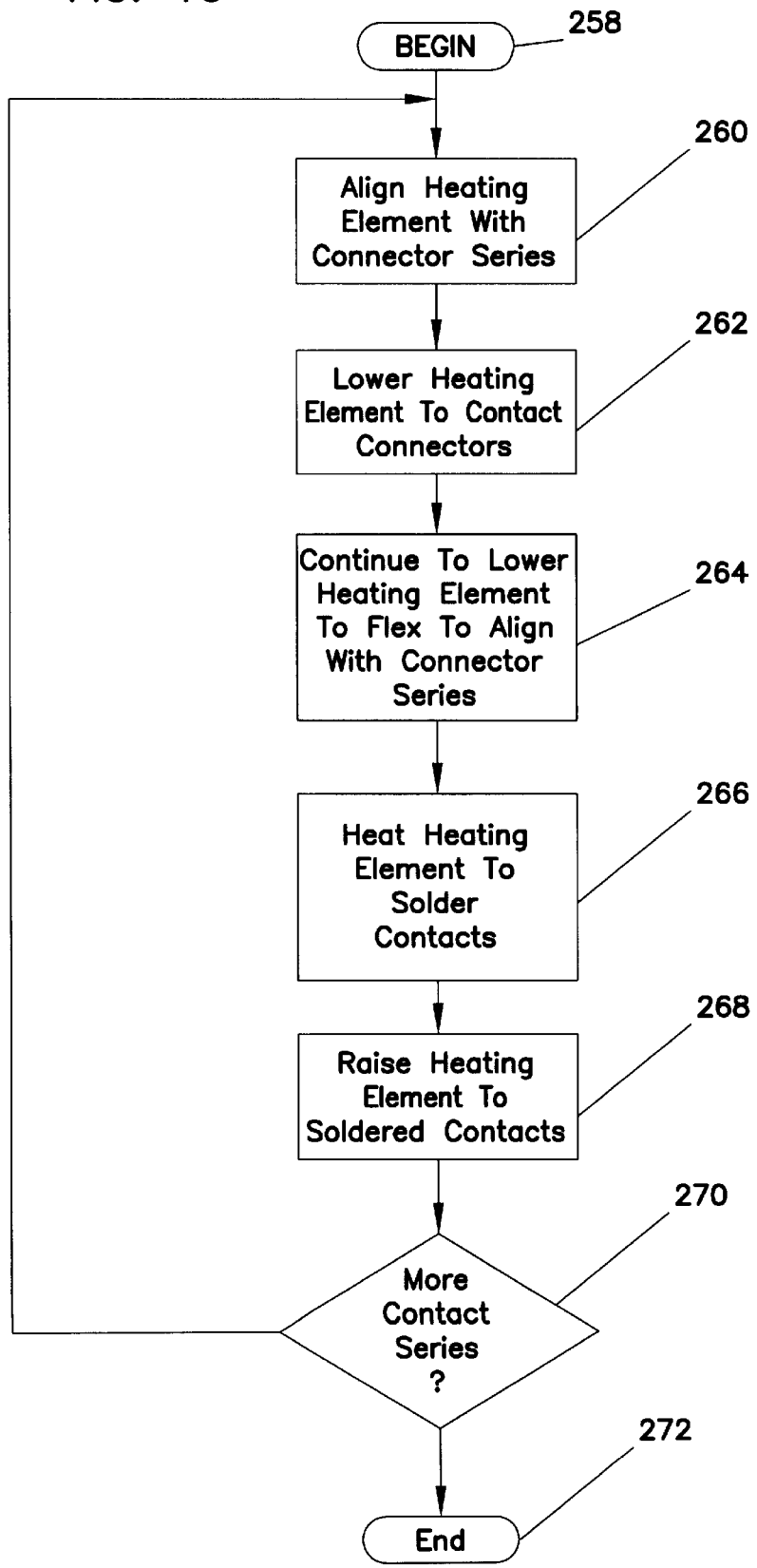
FIG. 10 is a block diagram of an embodiment of a soldering operation.

FIG. 10 is a block diagram illustrating steps 258 through 272 of operation for soldering a series of connectors, using soldering member 150 coupled to support fixture 240. As illustrated by block 260, the position of heating element 114 is aligned with a row of connectors by adjusting block mount 230 along track 248. The heating element is lowered to the contact position via operation of arm extension 246, as illustrated by block 262. The heating element 114 is lowered until the heating element 114 contacts each connector of a series via flexure of arms 152, 154 flexibly supporting heating element 114, as illustrated by block 264. Current is supplied to conductors 124, 126 to heat heating element 114 to solder a series of contacts, as illustrated by block 266. Thereafter, the soldering member 150 is raised to the raised position (shown in FIG. 8) as illustrated by block 268. The process is repeated for each row 214-1 to 214-n of connectors, as illustrated by block 270.

Thus, as described, soldering member 150 of the present invention includes a heating member having heating element 114 flexibly supported via a rigid base. In the embodiment shown, heating element 114 is flexibly supported by opposed spring arm portions 164, 166 and 168, 170, coupled to rigid stems 156, 158 and heating element 114. The flexibly supported heating element 114 is not limited to the specific embodiment shown, and it is contemplated that alternate designs may be used to flexibly support heating element 114 so that the alignment can be adjusted, depending upon the orientation of a series of connectors to be soldered, and alternate designs are contemplated for the heating member or circuit portion. Although the invention has been illustrated with reference to connecting circuitry coupled to transducer elements of heads to circuitry of a disc drive, it should be understood that the invention is not limited to the specific application shown and that the soldering member described according to the invention may be used to solder any circuit portions including a plurality of connectors. Additionally, although the present invention is described for flexible circuit portions, it should be understood that the invention is not specifically limited to flex circuit portions and may be used to solder printed circuit boards, for example.

It is to be understood that, even though numerous characteristics and advantages of various embodiments of the present invention have been set forth in the foregoing description, together with details of the structure and function of various embodiments of the invention, this disclosure is illustrative only, and changed may be made in detail, especially in matters of structure and arrangement of parts, within the principles of the present invention to the full extent indicated by the broad general meaning of the terms in which the appended claims are expressed. For example, the particular elements may vary while maintaining substantially the same functionality without departing from the scope and spirit of the present invention. In addition, although the preferred embodiment described herein is directed to a soldering member for soldering contact leads coupled to transducer elements of heads to circuitry of a disc drive, it will be appreciated by those skilled in the art that the soldering member and teachings of the present invention can be applied to solder various circuit portions without departing from the scope and spirit of the present invention and is not limited to head leads or disc drives.

What is claimed is:

1. A soldering member comprising:
    an elongated heating element adapted to couple to a power source to heat an extent of the elongated heating element for soldering a series of connectors;
    a rigid base for supporting the elongated heating element; and
    means for coupling the elongated heating element to the rigid base.

2. A method of soldering a series of rigidly supported connectors via a soldering member including an elongated heating element defining a soldering axis, comprising steps of:

(a) flexibly supporting the heating element to adjust the orientation of the soldering axis;
    (b) positioning the heating element to contact the series of connectors while aligning the soldering axis with a support axis of the rigidly supported connectors;
    (c) heating the heating element to solder the series of connectors; and
    (d) removing the heating element from the series of soldered connectors.

3. The method of claim 2 wherein the positioning step includes continually moving the heating element toward the series of connectors after the heating element contacts the series of connectors to reorientate the flexibly supported elongated heating element to align with the support axis of a series of connectors.

4. A soldering member comprising:
    an elongated heating element adapted to couple to a power source to heat an extent of the elongated heating element for soldering a series of connectors;
    a rigid base for supporting said elongated heating element; and
    a flexibly coupling member which adjusts orientation of the elongated heating element relative to the rigid base.

5. The soldering member of claim 4 wherein the flexibly coupling member comprises a spring member operably coupled to said rigid base and said elongated heating element.

6. The soldering member of claim 4 wherein the rigid base includes rigid conductor members supported in spaced parallel relation and operably coupled to the heating element and adapted to couple to the power source.

7. The soldering member of claim 4 wherein a length dimension of the elongated heating element corresponds to a length dimension of a series of connectors to be soldered in a single application.

8. The soldering member of claim 4 wherein the elongated heating element includes a planar heating surface.

9. The soldering member of claim 8 wherein a thickness dimension of the planar heating surface is sized proportional to a thickness dimension of a series of connectors to be soldered.

10. The soldering member of claim 4 wherein the flexible coupling member includes spaced arms operably coupled to the rigid base, the spaced arms including flexibly coupled arm portions, one of said arm portions being coupled to the rigid base and the other of said arm portions being coupled to the heating element to define the flexible coupling member.

11. The soldering member of claim 10 wherein the heating element includes opposed ends and the arms are coupled to opposed ends.

12. The soldering member of claim 10 wherein said flexibly coupled arm portions form a "V"-shaped member.

13. The soldering member of claim 10 wherein the spaced arms are coupled to a power source to form a portion of a heating circuit for the heating element.

14. The soldering member of claim 10 including a rigid stem portion, the arms are coupled to the stem portion, the arms and stem portion being coupled to a power source to form a portion of a heating circuit for heating the heating element.

15. The soldering member of claim 14 including a plurality of stem portions.

* * * * *